United States Patent
Dauleh

(10) Patent No.: US 11,352,770 B2
(45) Date of Patent: *Jun. 7, 2022

(54) DRAIN DIVERTED DIRTY WATER AND CONTINUOUSLY CIRCULATED CLEAN WATER SYSTEM

(71) Applicant: Mazen I. Dauleh, Houston, TX (US)

(72) Inventor: Mazen I. Dauleh, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/995,403

(22) Filed: Aug. 17, 2020

(65) Prior Publication Data
US 2020/0378094 A1    Dec. 3, 2020

Related U.S. Application Data

(63) Continuation of application No. 15/763,076, filed as application No. PCT/US2017/017034 on Feb. 8, 2017, now Pat. No. 10,745,892.

(60) Provisional application No. 62/292,375, filed on Feb. 8, 2016.

(51) Int. Cl.
| | |
|---|---|
| *E03B 1/04* | (2006.01) |
| *E03C 1/04* | (2006.01) |
| *A47K 1/04* | (2006.01) |
| *A47K 1/12* | (2006.01) |
| *E03C 1/05* | (2006.01) |

(52) U.S. Cl.
CPC ............ *E03B 1/048* (2013.01); *E03B 1/042* (2013.01); *E03C 1/04* (2013.01); *A47K 1/04* (2013.01); *A47K 1/12* (2013.01); *E03B 2001/045* (2013.01); *E03C 1/057* (2013.01)

(58) Field of Classification Search
CPC .............. A47K 1/04; A47K 1/12; E03B 1/041
USPC ..................................................... 4/496, 626
See application file for complete search history.

(56) References Cited

U.S. PATENT DOCUMENTS 2,888,205 A * 5/1959 Trucco ...................... F21S 8/00
                                                                239/20

* cited by examiner

*Primary Examiner* — Lauren A Crane
(74) *Attorney, Agent, or Firm* — Michael G. Monyok

(57) ABSTRACT

According to embodiments of the present disclosure is a water delivery system that continuously flows and recirculates clean water, diverting only water that has touched a user's hands. No sensing is required to activate the water flow and the actions of the user effectively divert the dirty water to a drain. The water delivery system comprises a clean water outlet, a clean water inlet, a dirty water drain, and a circulation pump. A stream of water continuously flows from the outlet and is received by the water inlet if the stream is uninterrupted. If the stream is disturbed, such as by the hand washing activities of the user, the stream is diverted from the inlet and instead falls into a sink and into the drain.

10 Claims, 19 Drawing Sheets

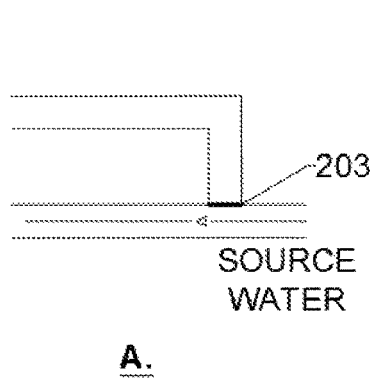 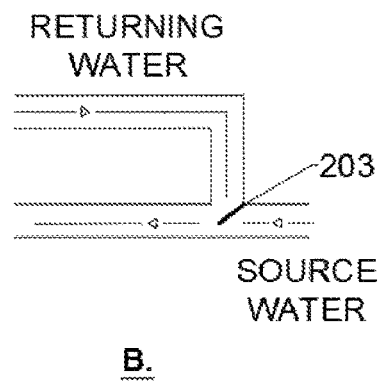 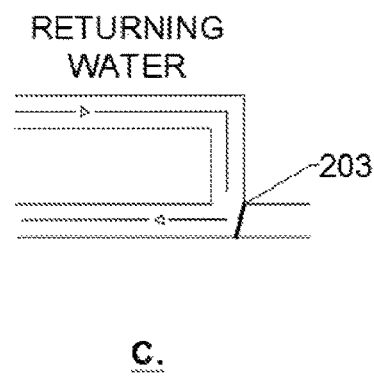
FIG. 5A  FIG. 5B  FIG. 5C
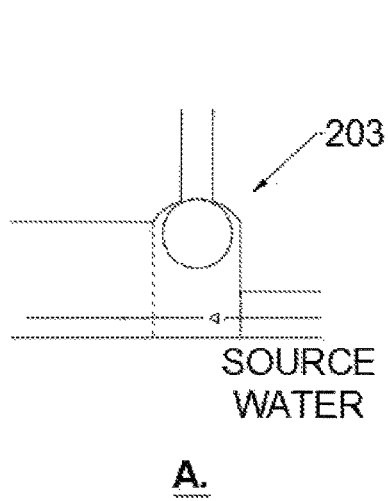 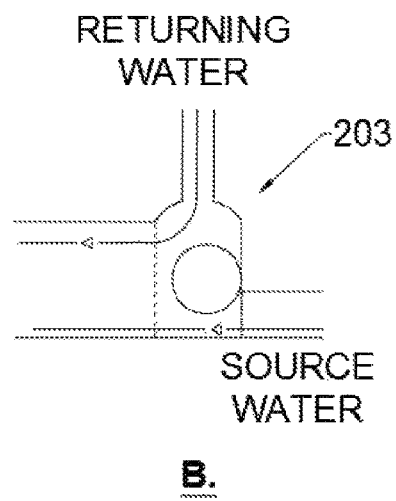 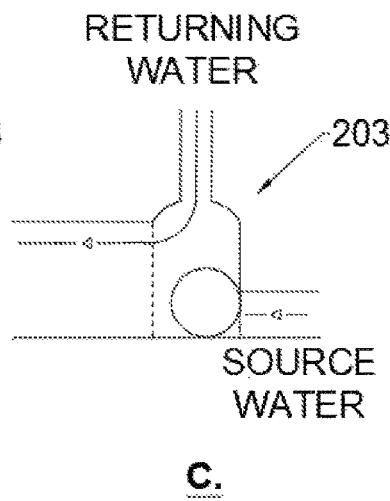
FIG. 6A  FIG. 6B  FIG. 6C

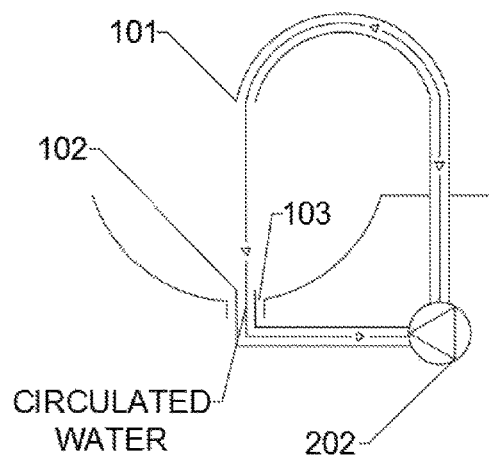
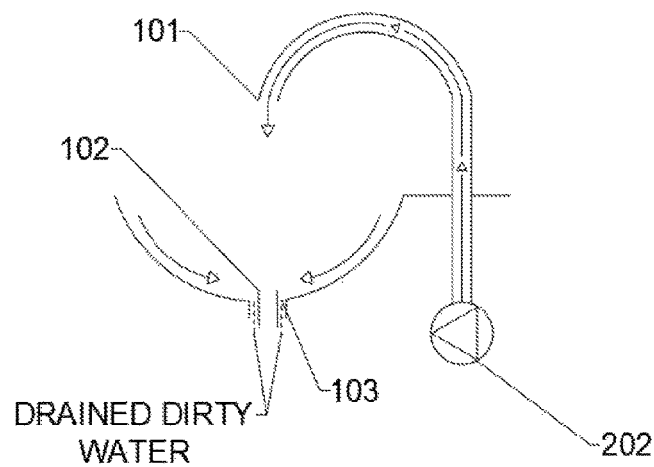
FIG. 13A  FIG. 13B
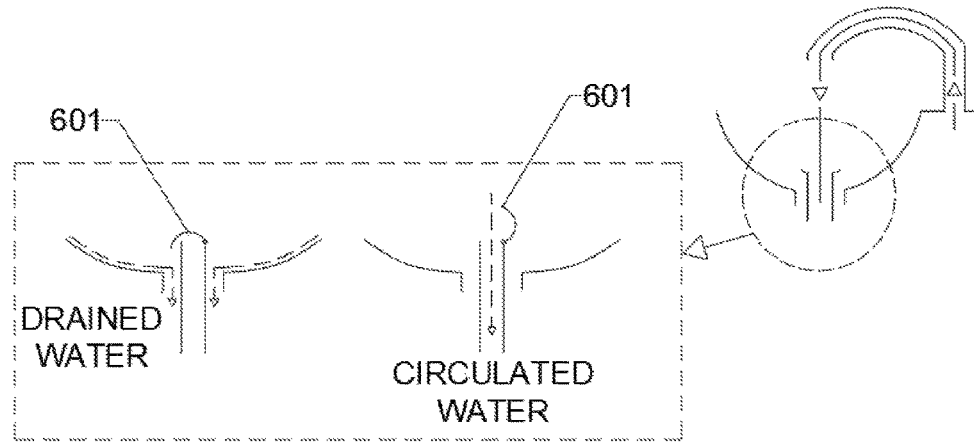
FIG. 14A  FIG. 14B

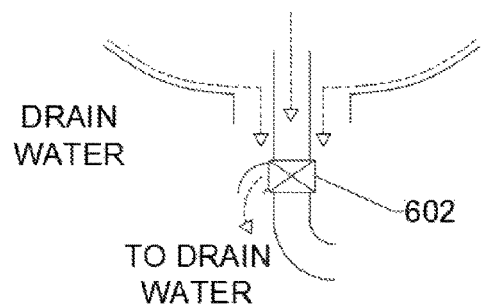
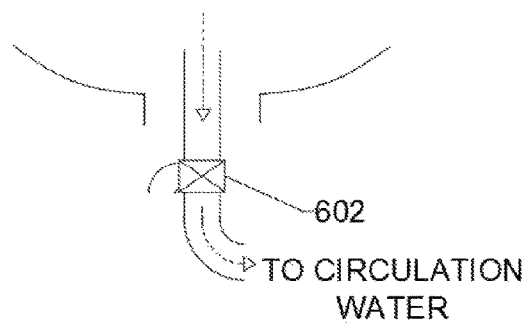
FIG. 15A                FIG. 15B
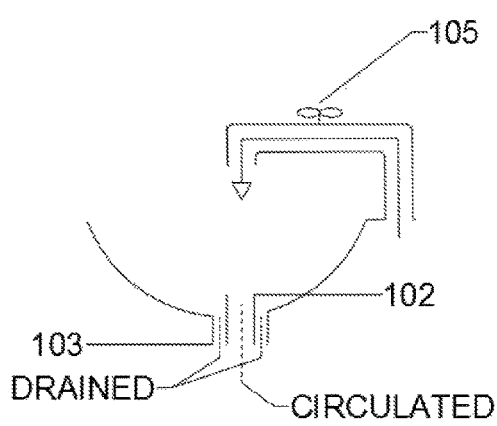
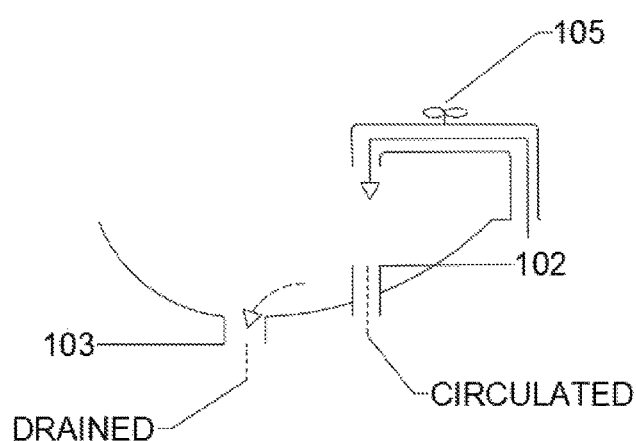
FIG. 16A                FIG. 16B

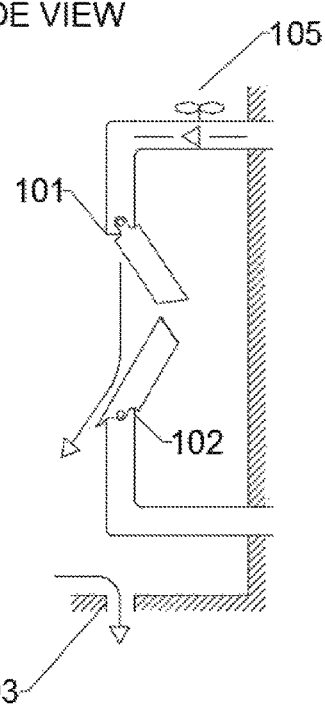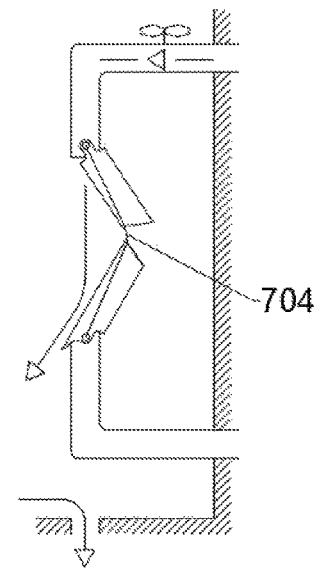
FIG. 22A    FIG. 22B    FIG. 22C    FIG. 22D

FIG. 24A
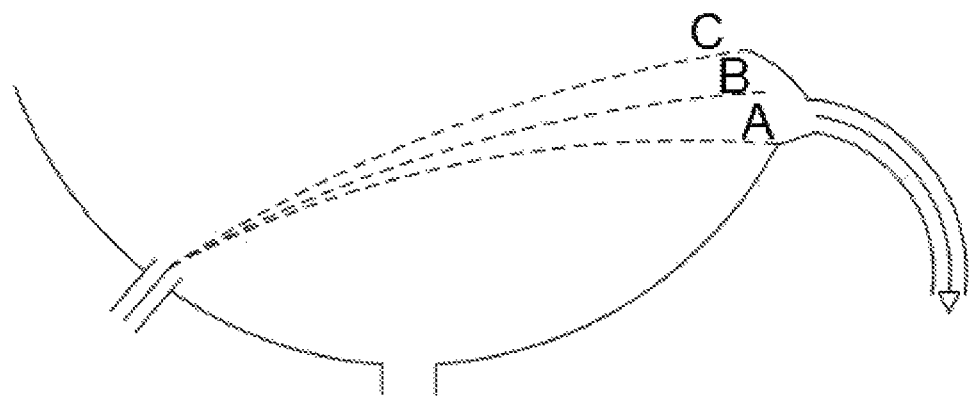
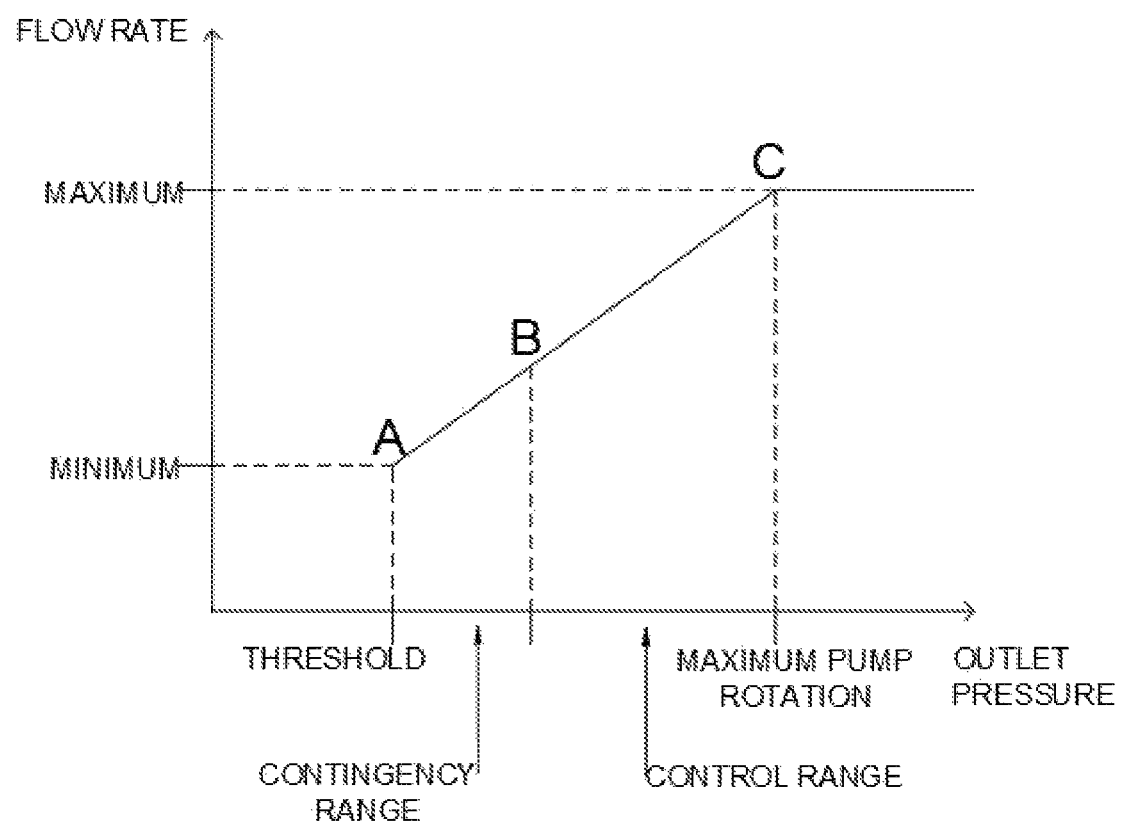
FIG. 24B

DRAIN DIVERTED DIRTY WATER AND CONTINUOUSLY CIRCULATED CLEAN WATER SYSTEM

CROSS-REFERENCE TO RELATED APPLICATIONS

The present application is a Continuation of U.S. Ser. No. 15/763,076 filed Mar. 23, 2018, which is a 35 U.S.C. 371 US national phase application of PCT international application serial number PCT/US2017/017034, entitled "Drain Diverted Dirty Water and Continuously Circulate Clean Water System" and filed on Feb. 8, 2017, all incorporated by reference herein in their entirety.

STATEMENT REGARDING FEDERALLY SPONSORED RESEARCH

Not Applicable.

BACKGROUND OF THE INVENTION

The invention relates generally to water delivery systems. More specifically, the invention relates to a water delivery system comprising a sink, faucet, and pumping devices that continuously circulates clean water and diverts dirty water that has touched a user's hands. By diverting only contaminated water and recirculating clean water, the water delivery system has the ability to improve water conservation.

Several prior art systems have been designed in an attempt to conserve water. For example, in public restrooms, some systems rely on sensors that automatically turn on the flow of water when a user's hands are placed below the faucet. To conserve water, the flow is terminated when the user's hands are removed. These widely used systems are often referred to as automatic faucets. Automatic faucets have two key parts: a sensor, such as an infrared sensor, that senses the proximity of the user's hands and an electrically switched valve that opens the water flow.

Theses automatic faucets suffer from problems associated with both the sensor and the switched valve. For example, the sensor is not always accurate and may start the water flow too early or keep it running after the user moves his hands away from the faucet. In addition to wasting water, the lack of accurate responsiveness of those sensors results in inconvenience to the user.

The main disadvantage with these types of systems is the added cost. In addition, automatic faucets require batteries, which deplete and run out over time, or require a dedicated power source. These components are vulnerable to failure. In fact, the fundamental disadvantage of the automatic faucets' water conservation methodology is that it relies on sensing and switching, both of which are carried out by extra components that require power, maintenance, and can fail.

Other water conserving systems include self-closing faucets, such as those used in airplanes and other public restrooms. With these systems, the user depresses a knob on the faucet to begin the flow of water. The knob slowly returns to the off position, at which time the water flow ceases. Users find these faucets inconvenient because the time period the faucet stays open is fixed and is normally too short for a particular user and she has to re-press the knob several times while using the faucet. If the faucet remains open too long, water is being wasted. Theses faucets are prone to failure of the mechanical timing mechanism that results in the time period becoming even shorter, leading to inconvenience, or longer and leading to water waste.

Another disadvantage of self-closing faucets is the need to touch them with unclean hands, which is a hygiene hazard in public bathrooms and health facilities. It would therefore be advantageous to develop a water conservation system that does not suffer the drawbacks associated with the prior art.

BRIEF SUMMARY OF THE INVENTION

According to embodiments of the present disclosure is a water delivery system that continuously flows and recirculates clean water, diverting only water that has touched a user's hands. No sensing is required to activate the water flow and the actions of the user effectively divert the dirty water to a drain. In one configuration, the water delivery system comprises a clean water outlet, a clean water inlet, a dirty water drain, and a circulation pump. A stream of water continuously flows from the outlet and is received by the water inlet if the stream is uninterrupted. If the stream is disturbed, such as by the hand washing activities of the user, the stream is diverted from the inlet and instead falls into a sink and into the drain. A circulation pump continuously moves the water from the inlet, which can be combined with source water, to the outlet. The system can be designed in various configurations by placing the inlet and outlet of the water stream in different positions, which makes it flexible and comfortable for different uses.

The present invention is particularly economical in mosques, hotels, and airports where there are multiple faucets in the same place since the system could be run by one circulation pump and one circulation valve. In contrast, automatic faucets require a sensor and switch/solenoid for each faucet on each sink.

With respect to water conservation, some studies have concluded that automatic faucets fared worse than conventional systems under many circumstances. The system of the present invention solves this problem by diverting only dirty water; once the user removes his hands away from the water stream/beam, no water will be wasted. In addition to the conservation benefits, the water delivery system of the present invention provides the following additional benefits: (1) inhibiting the spread of germs common to traditional faucets; (2) aiding use by elderly or physically disabled users; and (3) reducing the risk of scalding incidents by hot water.

In alternative embodiments, ozone and ultraviolet treatment can be applied to the water stream and the recirculated water. Because of the increased time the water dwells in the system due to recirculation, sanitation can be improved. In yet another embodiment, lighting can be added to the water stream to provide decorative features. This feature can be used in luxury hotels or homes where the continuously running water stream will act as a decorative water fountain illuminating with beautiful light patters that can even be synched to relaxing background music, or just left to the relaxing sound of fountain like water.

BRIEF DESCRIPTION OF THE SEVERAL VIEWS OF THE DRAWINGS

FIGS. 5A-5C are schematics of different orientations of a circulation valve used to replenish diverted water.

FIGS. 6A-6C show alternative embodiments of the circulation valve used for replenishing water.

FIGS. 13A-13B depict a traditional sink and faucet modified with the water delivery system of the present invention.

FIGS. 14A-14B illustrate the system with an activated drain cover, which can be used as an enhancement to traditional systems.

FIGS. 15A-15B show the system with an activated drain valve.

FIGS. 16A-16B depict the system in an embodiment with a long sink modification of an existing system.

FIGS. 22A-22D shows an alternative embodiment having a mechanically operated circulation mechanism.

FIGS. 24A-24B show the relations between water flow-rate, pressure, and circulation pump control required to ensure optimal operation of the water delivery system.

DETAILED DESCRIPTION OF THE INVENTION

Figure 1:
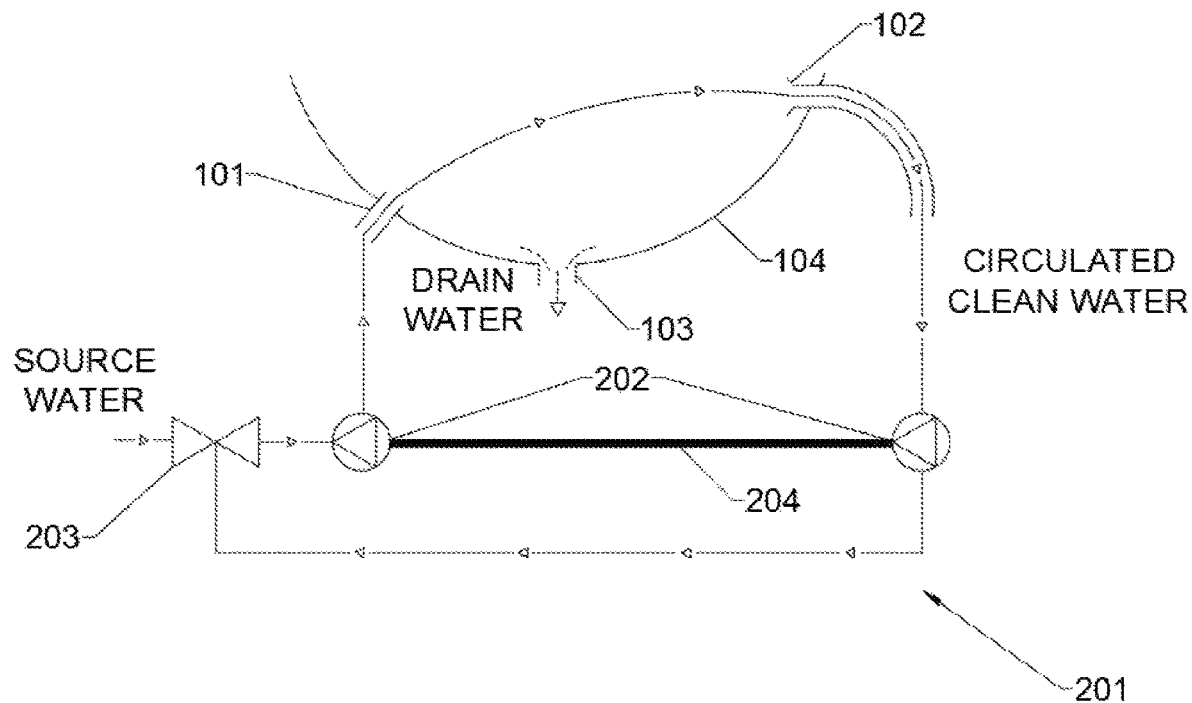
FIG. 1 is a schematic of the water delivery system according to one embodiment.
Figure 3:
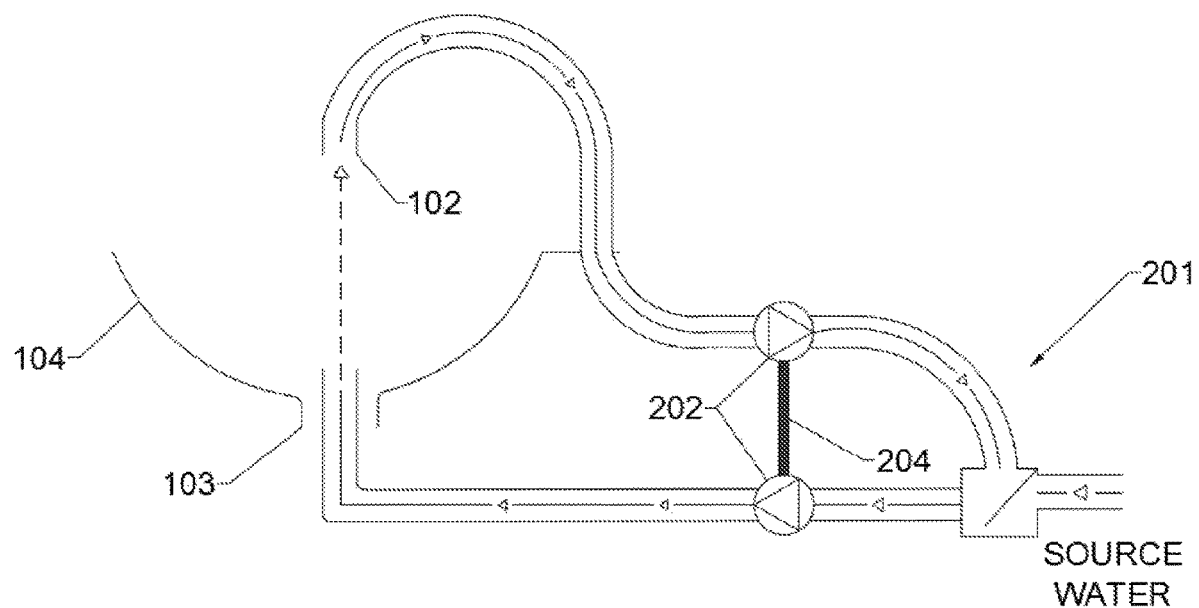
FIG. 3 shows an alternative embodiment of the water delivery system.

In one embodiment, the water delivery system comprises a faucet, or outlet 101, clean water inlet 102, drain 103, and a recirculation system 201, which is shown in FIG. 1. In some embodiments, the recirculation system (or assembly) 201 comprises a circulation pump 202 and circulation valve 203. The faucet 101, or water outlet, and inlet 102 are positioned within a sink 104 or other basin and separated by a distance. The faucet 101 is designed so that water exiting the faucet 101 travels in a stream directly to the water inlet 102. In one embodiment, the water exits the faucet 101 as a laminar water stream so that substantially all of the water enters the water inlet 102 if uninterrupted by an outside force, such as a user's hands. As shown in FIG. 1, the faucet 101 is placed at a lower position than the inlet 102, where the water stream travels in an upward trajectory. However, any positioning of the faucet 101 and inlet 102 that allows water exiting the faucet 101 to enter the inlet 102 can be used. In the alternate embodiment shown in FIG. 3, for example, the water stream has a nearly vertical trajectory from the outlet 101 to the inlet 102.

Figure 4:
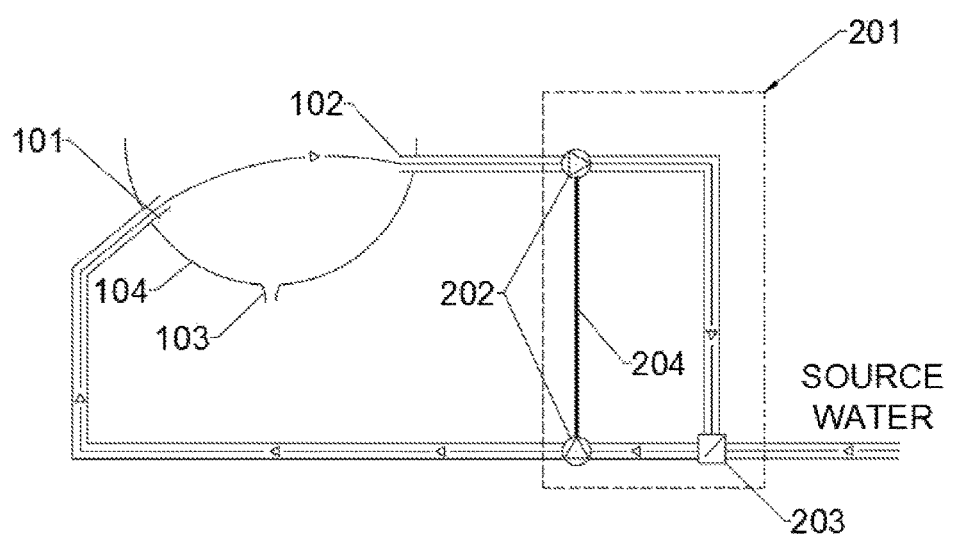
FIG. 4 depicts the water delivery system showing a circulation pump assembly integrated in the system.

Water received by the inlet 102 enters the recirculation system 201, where a circulation pump 202 moves the water back to the faucet 101. A circulation valve 203 is provided to add source water, such as from a municipal water supply, to the recirculated water. This is necessary when water is diverted to the drain 103 and does not enter the inlet 102. An example recirculation system 201 is shown in FIG. 4.

Figure 2:
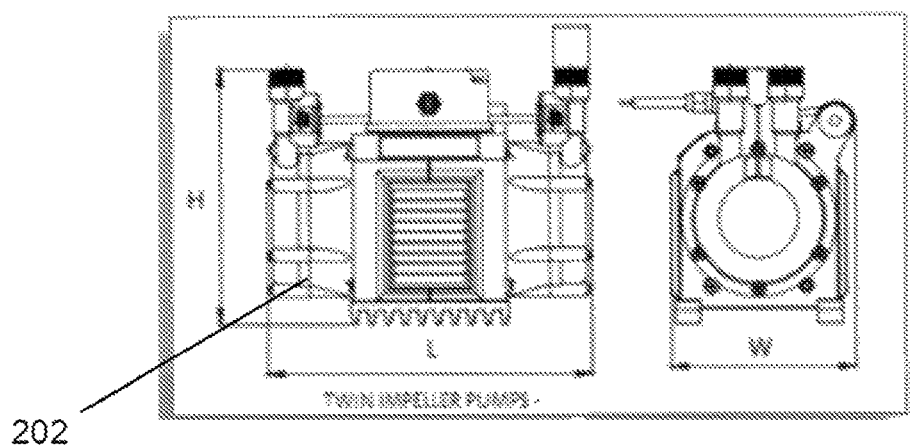
FIG. 2 shows a twin-impeller recirculation pump, according to one embodiment.

In one embodiment, the circulation pump 202 is a twin impeller pump, such as the one shown in FIG. 2. Although, a single impeller pump can be used if placed on the receiving end of the water circulation loop piping, inline after the water inlet 102. The circulation pump 202 can be a dedicated one for a single sink, or one for several sinks in a public bathroom. Alternatively, one pump 202 can be used for the whole house with circulation piping running back to it. The pump 202 can be electrically driven, or alternatively, driven by the pressure from the municipality water coming to the house. The impeller shaft 204 can be used to keep both pump impellers moving when water flow is inconsistent.

The drain 103 is positioned at the lowermost portion of the sink 104, as is typically encountered. In one example embodiment, the drain 103 is positioned away from the water inlet 102 to prevent contaminated water from entering the inlet 102. Referring again to FIG. 1, two water streams are shown—a first stream traverses the gap between the outlet 101 and the inlet 102, which occurs when the user does not interrupt the water stream's path; and a second stream drains through the drain 103 when the user interrupts the water stream. Users interrupt the stream when washing their hands, for example. As such, the water entering the drain 103 can be sent to a sewage system, or filtered and reused in gray water systems, irrigation, or other purposes that do not require pure water.

While several example embodiments have been disclosed so far, water system engineers and experts in water flow physics can vary the technical implementation of the water delivery system to ensure performance for the intended application. For example, some systems may value a beautiful and coherent stream of water, or "water beam," over other considerations. As will be discussed in greater detail, the system design can be varied with respect to water pressure, circulation, water rate, and water beam trajectory.

FIGS. 5A-5C and FIGS. 6A-6C depict various embodiments of a circulation valve 203, which mixes recirculated water with source water. As shown in FIG. 5A, the valve 203 can be in the closed position, where only source water is directed towards the faucet 101; the valve 203 can remain partially opened (FIG. 5B), where source water and recirculated water are mixed; or the valve can be fully opened (FIG. 5C), where only recirculated water is moved towards the faucet 101. FIGS. 6A-6C show an alternative embodiment of the valve 203 comprising a ball valve. In FIGS. 6A-6C, the ball valve is shown in closed, partially open, and open configurations. As previously stated, source water is needed when a user diverts water into the drain 103, such as when washing their hands.

In one embodiment, the water delivery system has a recirculation system 201 for every sink 104 in a house or a similar small scale application where a single system can be deployed. In public restrooms, a single recirculation system 201 can be used for multiple sinks 104 to increase the economy of the system. In yet another embodiment, the circulation pump 202 can be hydraulically driven by the pressure of the municipality water, or the pressure generated by the central house pressure pump. Where water pressure is sufficient, this hydraulic (water driven) pump solution would be advantageous as no electrical pump needs to be installed reducing electric power consumption and complexity in the house.

To retrofit the water delivery system in a house with existing plumbing, and using an existing house central pressure pump to avoid installing separate circulation pumps for every sink, concentric flexible tubes can be installed inside the existing pipes. This method avoids the hassle and damage required to install a new set of parallel piping back to the central house pressure pump. The disadvantage of concentric piping is obviously the total water volume reduction that will result, and should the original installed pipes be small, this option is not likely to work.

In addition to traditional home usage, the water delivery system of the present invention can be used in hotels, public toilets in airports and malls, restaurants, mosques, passenger airplanes and busses where water is scarce. Recent studies have shown that faucets in public bathrooms at airports have some the highest levels of germs. By having a continuously running water stream, there is no need for a user to touch the faucet 101 or any other part of the system to begin water flow.

Another widely spread method to conserve water is the use of aerators at the tip of faucets 101 to mix air with water and hence reducing the effective volume of water consumed for cleaning purposes. The faucet 101 of the present invention can use aerators as well, provided the water stream remains coherent enough to enter the water inlet 102. With the usage of a circulation pump 202, greater volumes of air can be mixed with the water using purposely designed aerators for greater conservation and other advantages over the standard ones.

Figure 7:
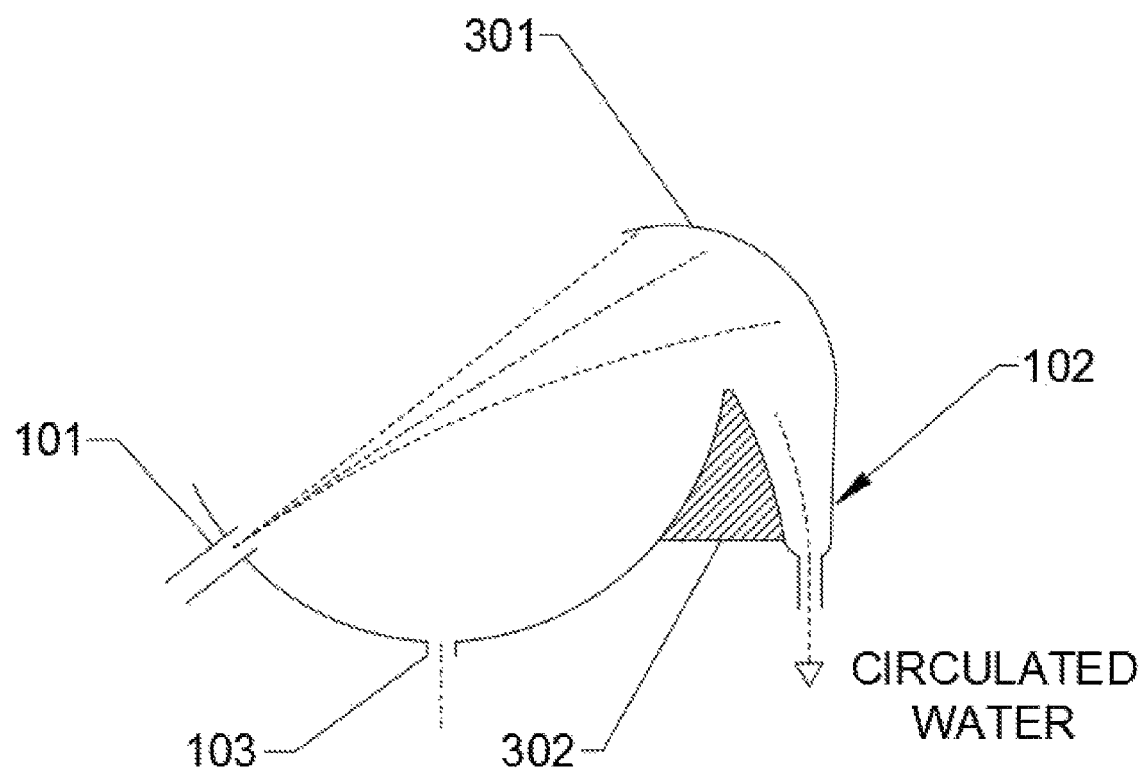
FIG. 7 shows an alternative embodiment for the faucet design with a barrier and receptor.

FIG. 7 shows an alternative embodiment in which the inlet 102 is placed behind a barrier 302. A receptor 301 can be used to direct the water towards the inlet 102. The key advantage of this barrier-receptor embodiment is its ability to function in the absence of a circulation pump or where the water pressure is varying, such as a rural setting. Because the area in which the water stream can strike the sink and still be collected by the inlet 102 is enlarged in this design, less water is inadvertently diverted to the drain 103 due to pressure fluctuations. In one embodiment, the receptor 301 is positioned above the inlet 102, so water received by the receptor 301 is transferred to the inlet 102 by gravity.

Figure 8:
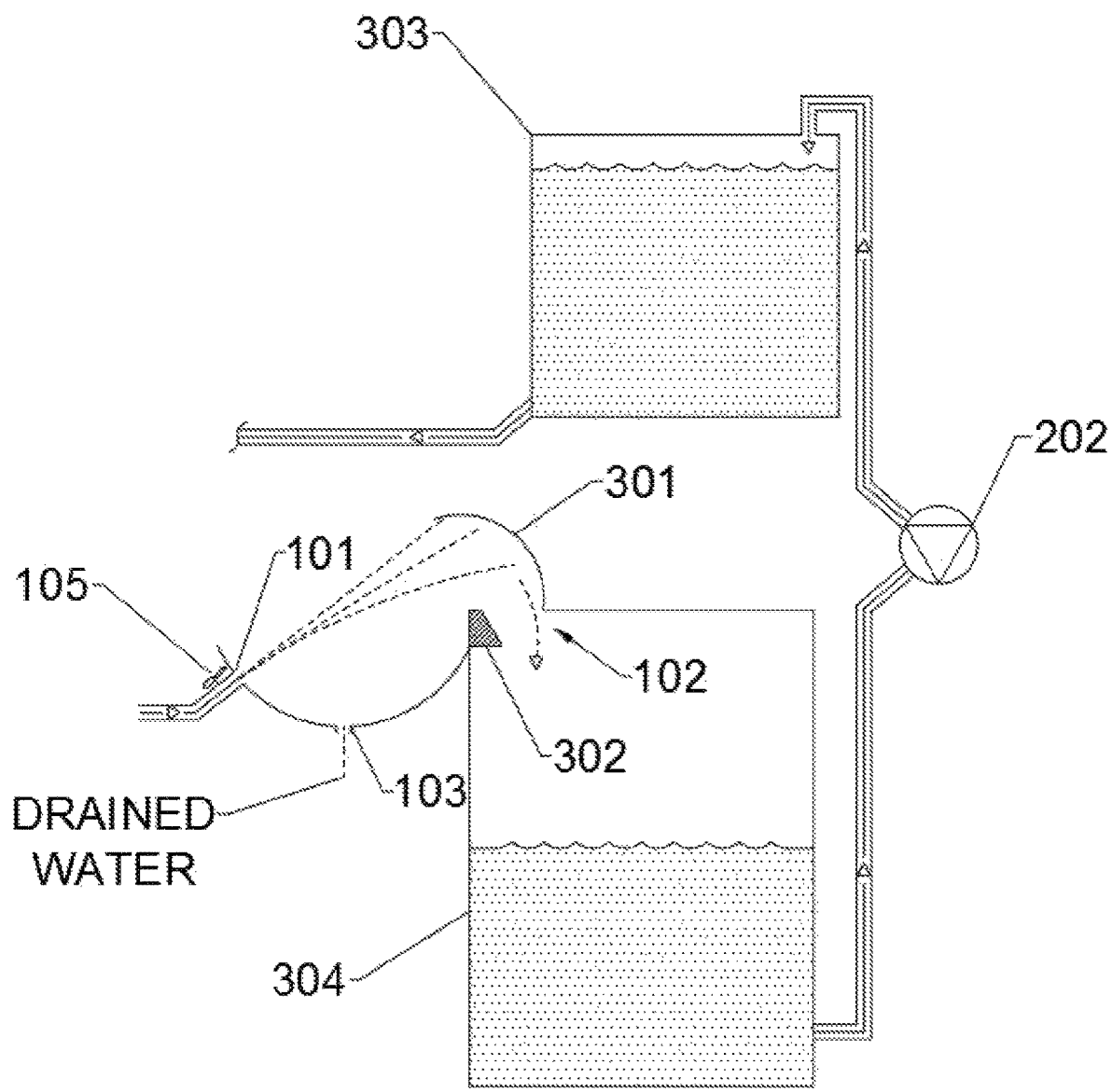
FIG. 8 illustrates a gravity-fed embodiment of the system that utilizes the embodiment shown in FIG. 7

FIG. 8 shows an alternative embodiment for the circulation system that utilizes the barrier-receptor embodiment shown in FIG. 7. In this embodiment, a manual pump 202 is used in connection with a gravity tank 303. Water from the upper gravity tank 303 supplies the pressure for the faucet 101. The faucet has a tap 105 that can be used to run water like a traditional faucet. The manual pump 202 moves/recirculates the water that accumulates in the lower tank 304 to the upper tank 303. The lower tank 304 stores clean water that has been circulated and has not come into contact with the user before being pumped to the upper tank 303. This embodiment is useful in areas where there is no electricity. In the embodiment shown in FIG. 8, a receptor 301 and barrier 302 are used to divert water to the inlet 102, since the water pressure may not be consistent.

Figure 9:
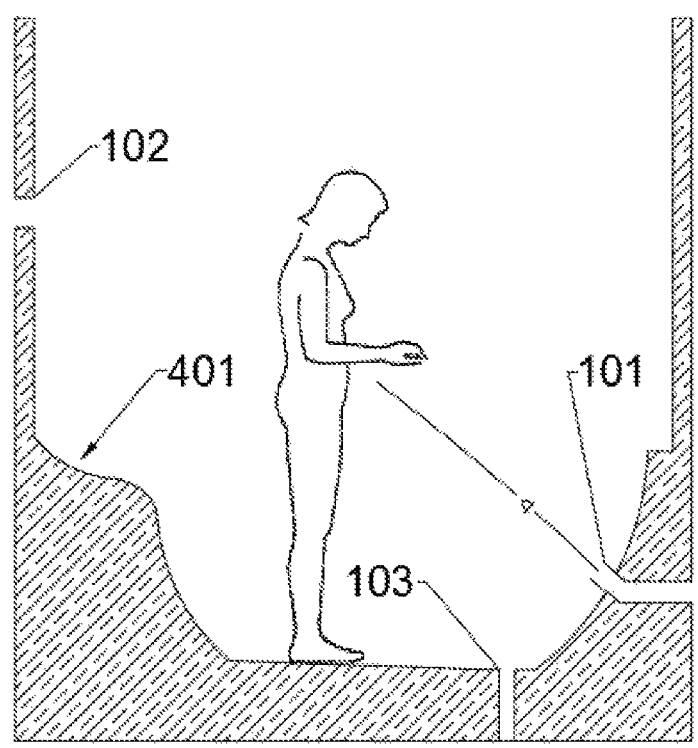
FIG. 9 shows a shower system embodiment as an alternative embodiment.

FIG. 9 depicts an alternative embodiment of the water delivery system for use as a shower. Water is projected from faucet 101 upwards. When a user enters the water stream, the water hits the user's body and is diverted from the path leading to inlet 102. Instead, the interrupted water drains through the drain 103. Similar to the previous embodiments, uninterrupted water flow is circulated through inlet 102. A catchment area 401 receives water that is not circulated and drains it back to the drain 103.

The water delivery system of the present invention provides opportunities to increase sanitation of the water due to the recirculation process. For example, ozone, water ionization and ultraviolet treatment can be applied to the water within the recirculation system 201 to sanitize the water and give it sanitizing properties. Because recirculated water will contact the treatment multiple times, there is a reduced risk of pathogens not being treated.

The benefits of "in process" or "active sanitization" occurring in the recirculation pump can be important to hospitals since some germs accumulate within the water stream and not as a result of user's touching the faucets. In one known instance, a hospital in the United States switched back to traditional faucets from automatic ones as it discovered that automatic faucets accumulated greater concentration of bacteria than traditional ones.

While ozone, ultraviolet, and ionization water treatments are proven techniques, magnetizing water for sanitization is less known but the recirculation system 201 of the present invention provides an opportunity to treat water in ways not previously possible due to the nature of the circulation process that allows more time in contact with the water.

The water delivery system of the present invention provides benefits in addition to water conservation and sanitization. Humidification is often needed in locations were air is very dry. Excessively low humidity may occur in hot, dry desert climates or indoors in artificially heated spaces. In winter, especially when cold outside air is heated indoors, the humidity may drop as low as 10-20%. This low humidity can cause adverse health effects, by drying out mucous membranes such as the lining of the nose and throat, and can cause respiratory distress. The low humidity also can affect wooden furniture, causing shrinkage and loose joints or cracking of pieces. Books, papers, and artworks may shrink or warp and become brittle in very low humidity. In addition, static electricity may become a problem in conditions of low humidity, destroying semiconductor devices and causing annoying static cling of textiles, and causing dust and small particles to stick stubbornly to electrically charged surfaces. With a constant stream of water being recirculated, the humidity of the air in the vicinity of the water delivery system can be increased.

In one alternative embodiment, fragrances can be injected into the circulated water stream. This exposure and intermixing of the air in the room with the circulated water and its sanitization, humidification, and scenting induced-properties can be increased by keeping the system running continuously and by maximizing the aeration capacity of the water and the length of the water beam/stream exposed to room atmosphere. In one example, the scenting of the circulated water can be accomplished with fully natural fruit extracts, like orange skin fluid. Doing so will produce two benefits—it will replace the need for battery operated fragrance spray machines that people install on public bathroom walls and it will remove the need to use fragrance on their hands after washing their hands as some people like to do. In fact, most hand soaps people use have some fragrance mixed with it.

Figure 10A:
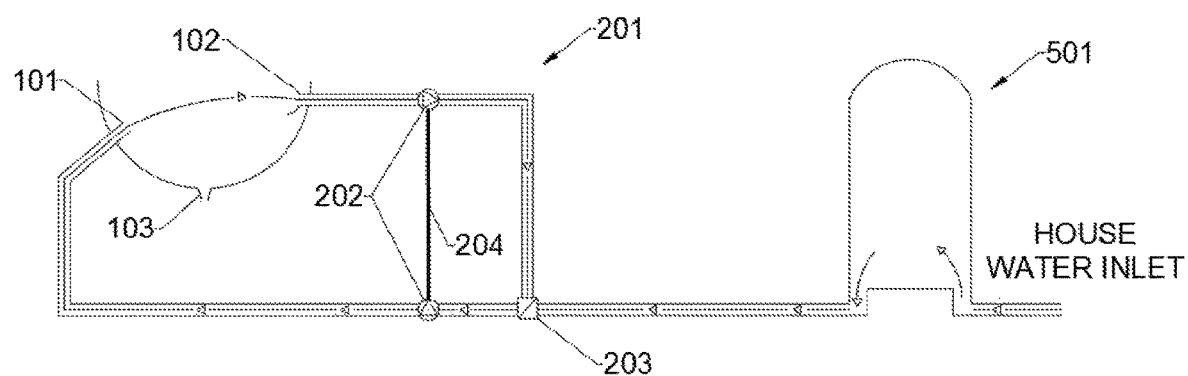
FIGS. 10A-10B depicts the water delivery system according to one embodiment including integration with a central water heater.
Figure 10B:
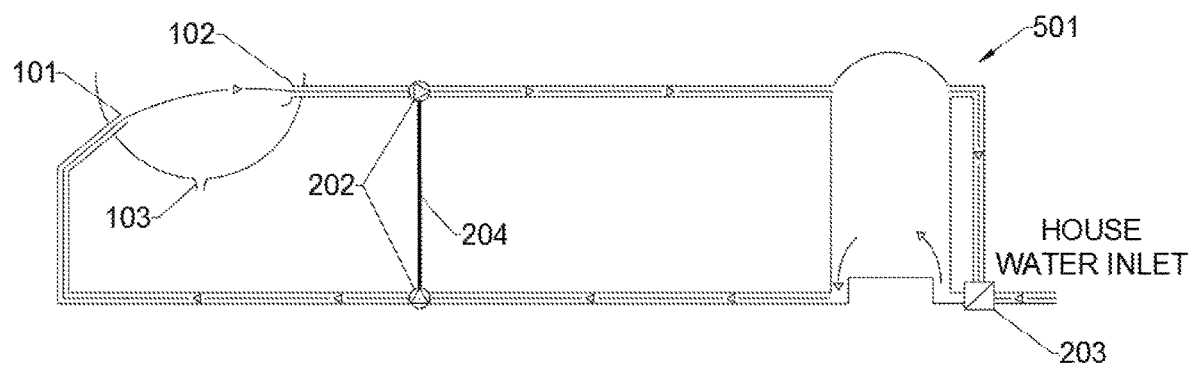

With traditional sinks and faucets, a considerable amount of water is wasted by users who drain some water until they get a desired water temperature. For example, some users let the water run until it becomes warm before washing their hands. This type of water wastage is known as water temperature control wastage. To solve this problem and provide the end user with warm water instantly, systems have been developed with a pump and a closed loop system that is used to continuously circulate water back to the main heater in the house, preventing it from becoming cold in the pipes. FIG. 10A shows a standard setting, where water in the pipes becomes cold when the lavatory is not in use. In FIG. 10B, the system of the present invention where the water is continuously circulated through the main water heater 501 is shown. Implementing such systems is expensive and is often only done in luxury homes. In embodiments of the present invention, the required additional pump and valve are part of the system and hence no additional cost is required. In other words, because the water delivery system of the present invention is a recirculation type system, the recirculation loop can include the house's main water heater 501 to keep the temperature of the water exiting the faucet 101 warm.

The circulation pump 202 (or at least, the circulation valve 203) can be placed at the input of the main water heater 501 to ensure that water in the pipes does not become stagnant or cold. Note however, that if the user decides to switch off the system, then the water in the pipes will become cold over time. When the system is switched back on and while the water in the pipes is allowed to flow in order to be replaced by the desired warm water, it is being circulated and not drained and wasted. Should the user decide that he does not want to waste his time waiting for the temperature to equalize, then he can either leave the system running continuously or program it to start circulating water few minutes prior to him using the system.

Figure 11:
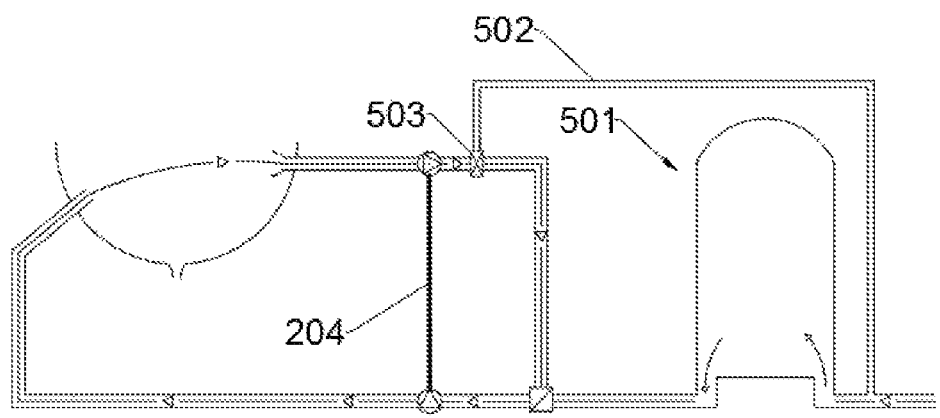
FIG. 11 is an alternative embodiment of the water conservation arrangement shown in FIG. 10.

The system of FIG. 10B can be cost prohibitive if modification of existing buildings and plumbing is necessary. Two other options exist for these situations. In one alternative embodiment, a small temperature equalizing tube 502 can be connected to the inlet of the water heater 501 from the recirculation system 201, as shown in FIG. 11. In this option, a small amount of recirculated water is returned to the main heater 501 and heated. Source water replaces the returned water. The water that is sent back in the small tube 502 is controlled using a temperature-equalizing valve 503. The equalizing valve 503 can function in three possible ways: it can be programmed to send water to the heater on timed intervals every hour depending on the temperature of the recirculated water; the valve 503 can send a fixed portion of the recirculated water back to the heater (3%, 5% or 10%) continuously; or, the valve 503 can be operated manually by the user at times when temperature equalizing is needed prior to starting a shower, for instance. The manual valve 503 can be a metered self-closing one for convenience to the user, and efficiency in electric power usage.

Figure 12A:
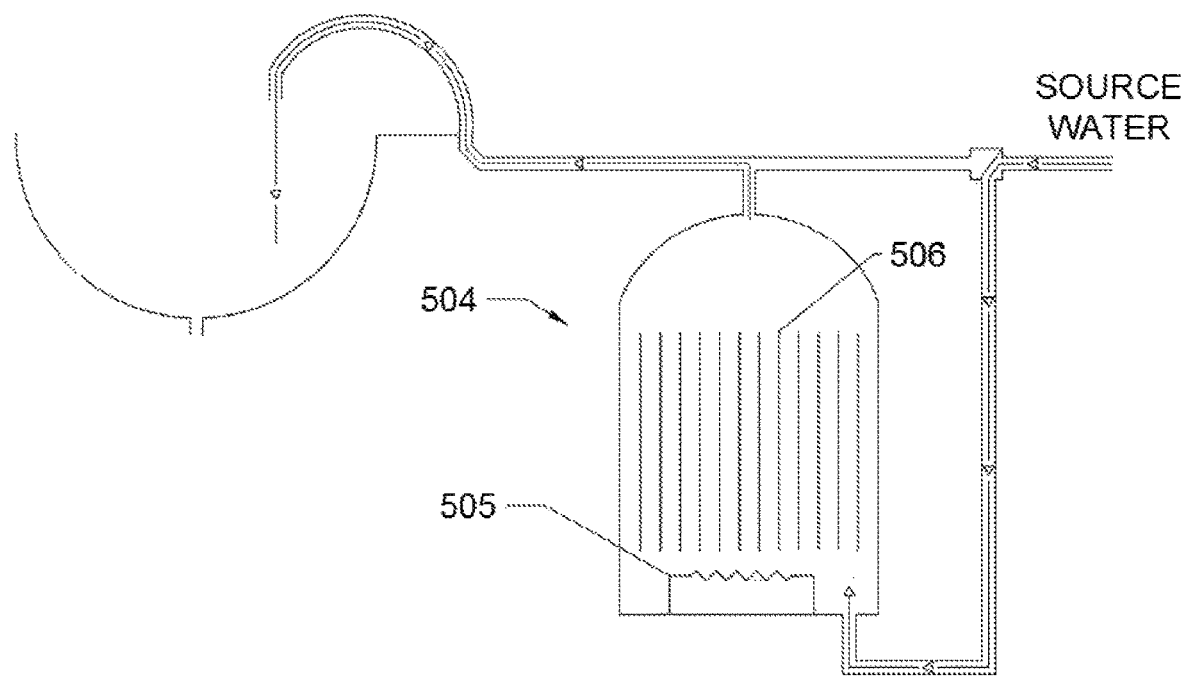
FIGS. 12A-12B show the water delivery system with a water heater in-line with the water entering the outlet.
Figure 12B:
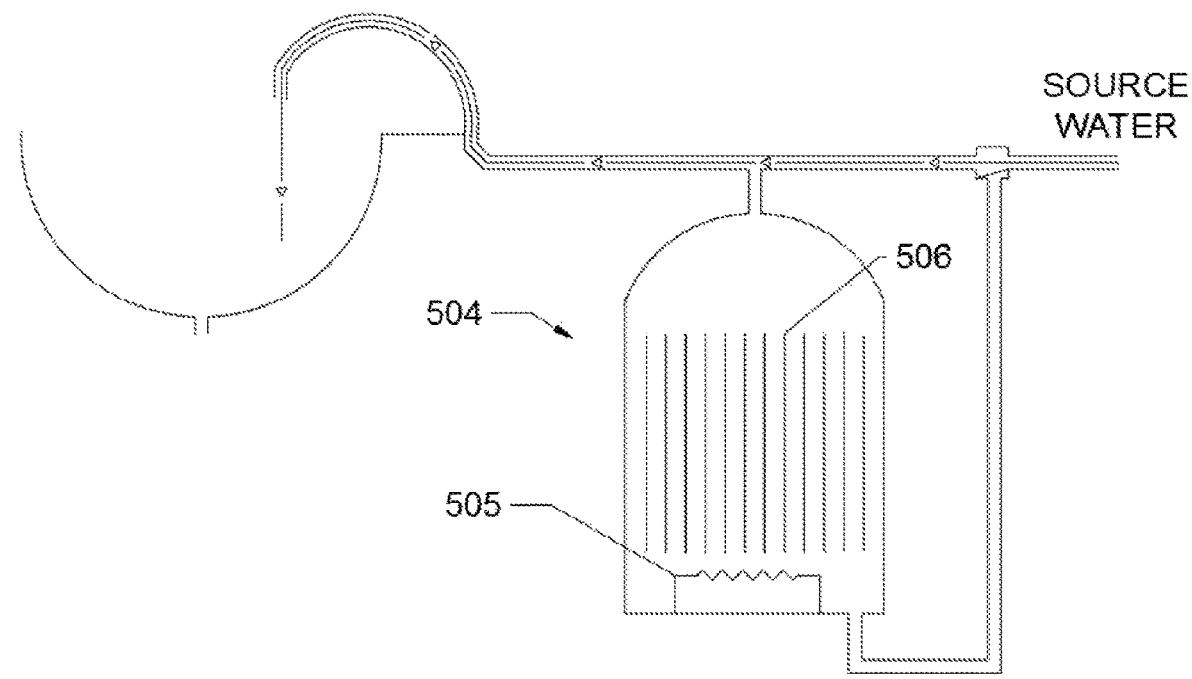

FIGS. 12A-12B show an alternative arrangement of the one shown in FIG. 10 that achieves water conservation by eliminating water temperature control wastage, but this time using a small in-line heater tank 504 near the sink 104 (with a special switching method), which can be used for conventional systems as well as for the system of the present invention. The inline heater 504 has a heating filament 505 which heats the water before entering the faucet. The heated water rises between metallic sheets 506 that assist the water in rising to the top of the heater 504. FIG. 12A shows the water flowing through the inline heater tank 504. FIG. 12B shows the water directly flowing from the main heater after cold water was diverted to the small inline heater tank 504. To use the water delivery system of the present invention instead of a conventional one, a user would have to replace the conventional faucet system (as highlighted in FIGS. 12A-12B) with the system 101 highlighted in FIGS. 10A-10B.

In yet another alternative embodiment, ornamental or decorative lighting effects can be included with the system. For example, the water beam exiting the faucet 101 can be colored with LED lights. In one design, a sink could have several water sources and several receptors in two semi-circles facing each other. LED lights can be different and altering between the several water beams. That can also be synchronized with some appropriate music. The sound of running water being recirculated in the system adds to the calming effect.

FIGS. 13A-13B depict the water delivery system of the present invention retrofitted into an existing sink 104. In this design, a circulation water receptor, or inlet 102, is added at the bottom of the sink 104 concentric with the drain 103. However, the inlet 102 is higher than the drain 103 opening by a couple of centimeters. FIG. 13A shows uninterrupted water flow where the stream is untouched by the user's hand and is circulated through the inlet 102. FIG. 13B shows interrupted flow where the water would flow through the drain 103. This retrofit is compact and can use existing holes in the sink 104.

In the simple modifications shown in FIGS. 13A-13B, the purity of the circulated water will not be 100% since some of the diverted water will fall down into the inlet 102. The purity may be 95%, for example. While filters could be used to bring purity to a 97% level, some users would still find it unacceptable. To overcome this problem, the inlet 102 can be covered with a solenoid activated cover 601, as shown in FIGS. 14A-14B. In this embodiment, a sensor is triggered by the hands of the user, which causes the solenoid to activate, covering the inlet 102. FIG. 14A shows the cover 601 in a closed position, while FIG. 14B shows the cover 601 in an open position. Alternatively, a solenoid valve 602 can be used to divert the water that has entered the inlet 102 into a discharge pipe, as shown in FIGS. 15A-15B. Similar to the embodiments shown in FIGS. 14A-14B, FIG. 15A shows the solenoid valve 602 diverting the water to the waste pipe when the water stream is in contact with the user's hand and FIG. 15B shows the solenoid valve 602 circulating the uninterrupted water stream.

This diversion system can even be used with traditional automatic faucets. With a recirculation system 201, new types of sensors can be used. For example, sensors such as capacitive or conductive sensors can be used. Specifically, the sensor triggered in the embodiment of FIGS. 14A-14B and 15A-15B can be a capacitive sensor. As the water stream is interrupted, a capacitive system detects a change in the electric charge and activates the drain valve 602 or the solenoid activated cover 601. The advantage of this new method is that more precise and accurate detection of the user's hands can be achieved, which will result in more efficient conservation of water and convenience to the user.

Figure 17:
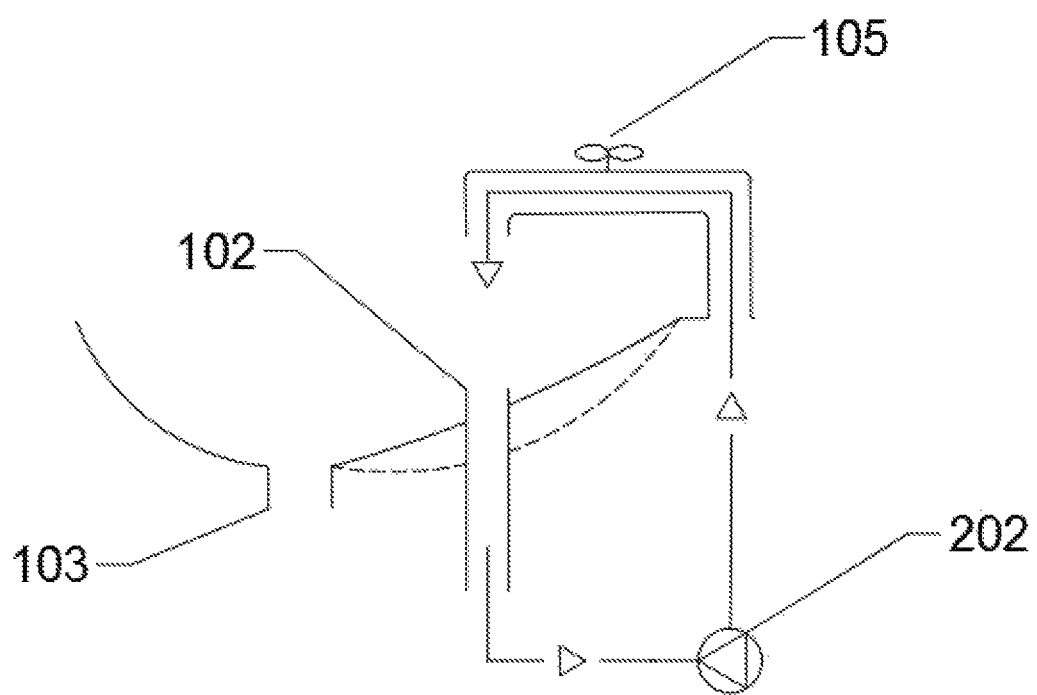
FIG. 17 shows the system retrofitted into a traditional sink.

FIG. 16B shows a "long sink" embodiment, where the purity of recirculated water is improved, with a traditional sink shown in FIG. 16A. In the long sink 104 embodiment, the hand lathering and washing process is kept distant from the inlet 102 to avoid dirty water falling into the circulation receptor, or inlet 102. The long sink design can be a new sink, as shown in FIG. 16, or the sink can be modified, as shown in FIG. 17.

Figure 18:
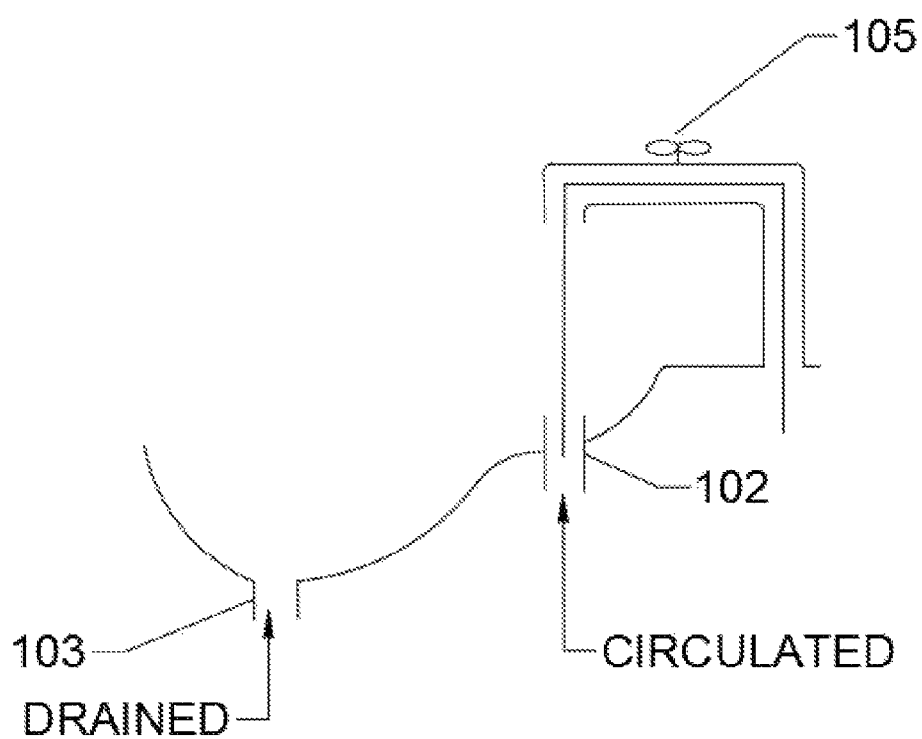
FIG. 18 shows an alternative embodiment to a long sink design.

The "long sink" embodiment can be further adjusted to distance the circulation path farther as shown in FIG. 18. As can be seen, the inlet 102 is moved upwards with the faucet, closer to the edge of the basin 104. This embodiment enhanced the circulation since the inlet 102 is further from the drain 103.

Figure 19:
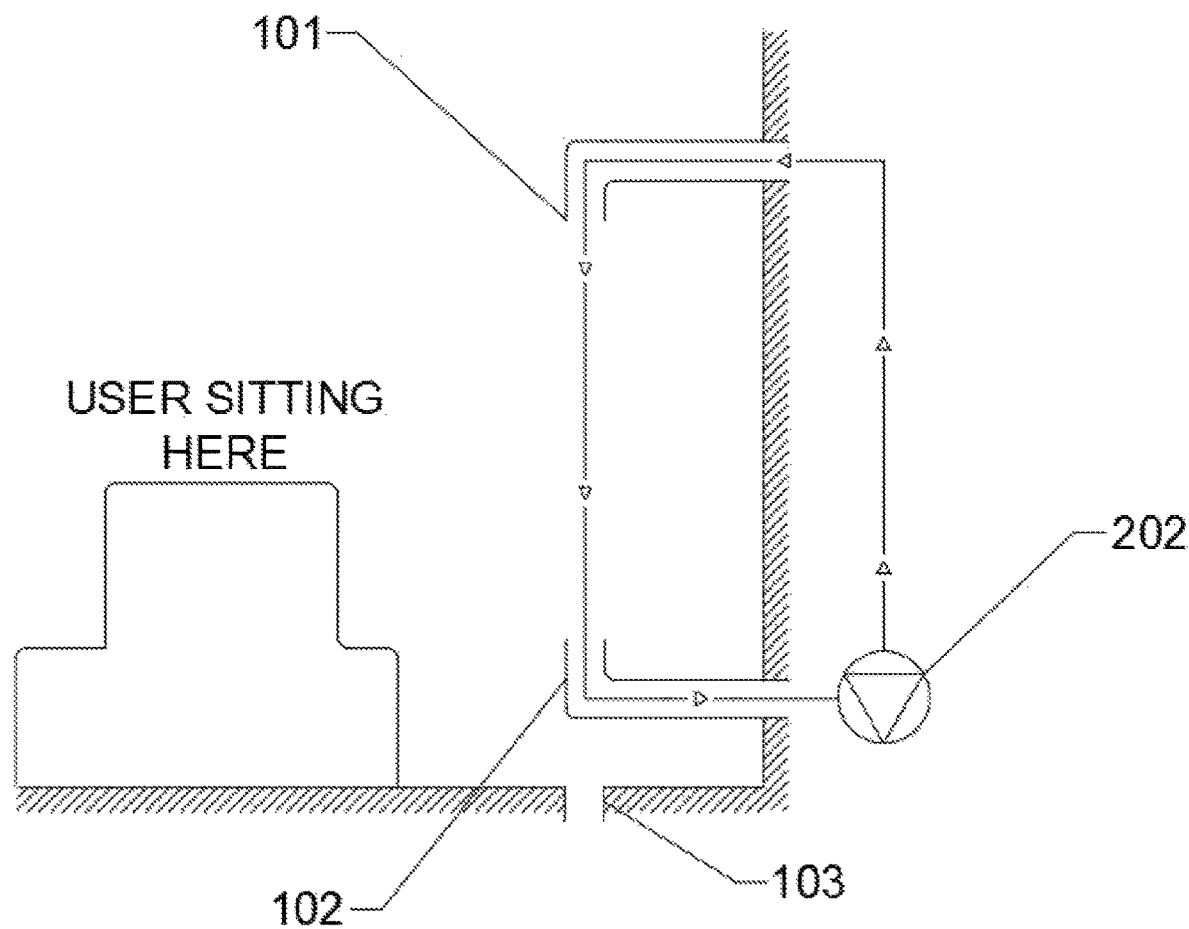
FIG. 19 shows an alternative embodiment useful in public washrooms.

Another simple modification to traditional systems is applicable to the ablution-process faucets available in many mosques around the world, which are used five times daily by mosque visitors and has tremendous potential for water conservation. For these types of systems, an inlet 102 is added at the bottom near the drain, as shown in FIG. 19. As indicated, the user can be sitting on the seating shown which is a typical faucet configuration in mosques. Any contact between the user's hand and the water stream diverts the path of the water and prevents the water from going through the inlet 102, instead diverting the stream to the drain 103 below.

Figure 20:
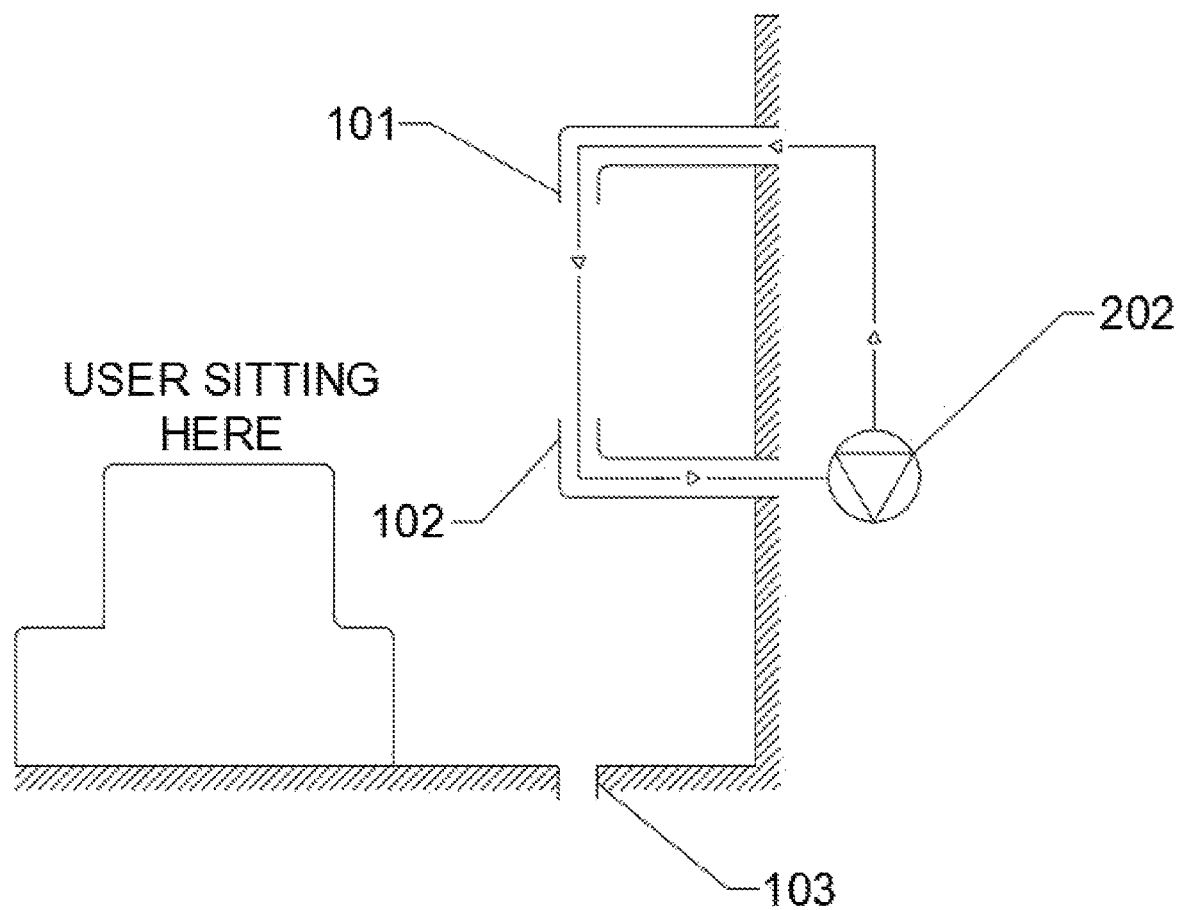
FIG. 20 shows an alternative embodiment of the system useful in public washrooms.

Similar to the embodiment illustrated in FIG. 18, in which the inlet 102 is placed further away from the hand washing activities, an alternative embodiment to the one shown in FIG. 19 is shown in FIG. 20. In this embodiment, the inlet 102 is also further away from the drain 103 compared with the embodiment of FIG. 19. For use in a mosque, this makes it harder for a user to clean his/her feet, but helps to lessen the amount of dirty water circulated unintentionally.

Figure 21:
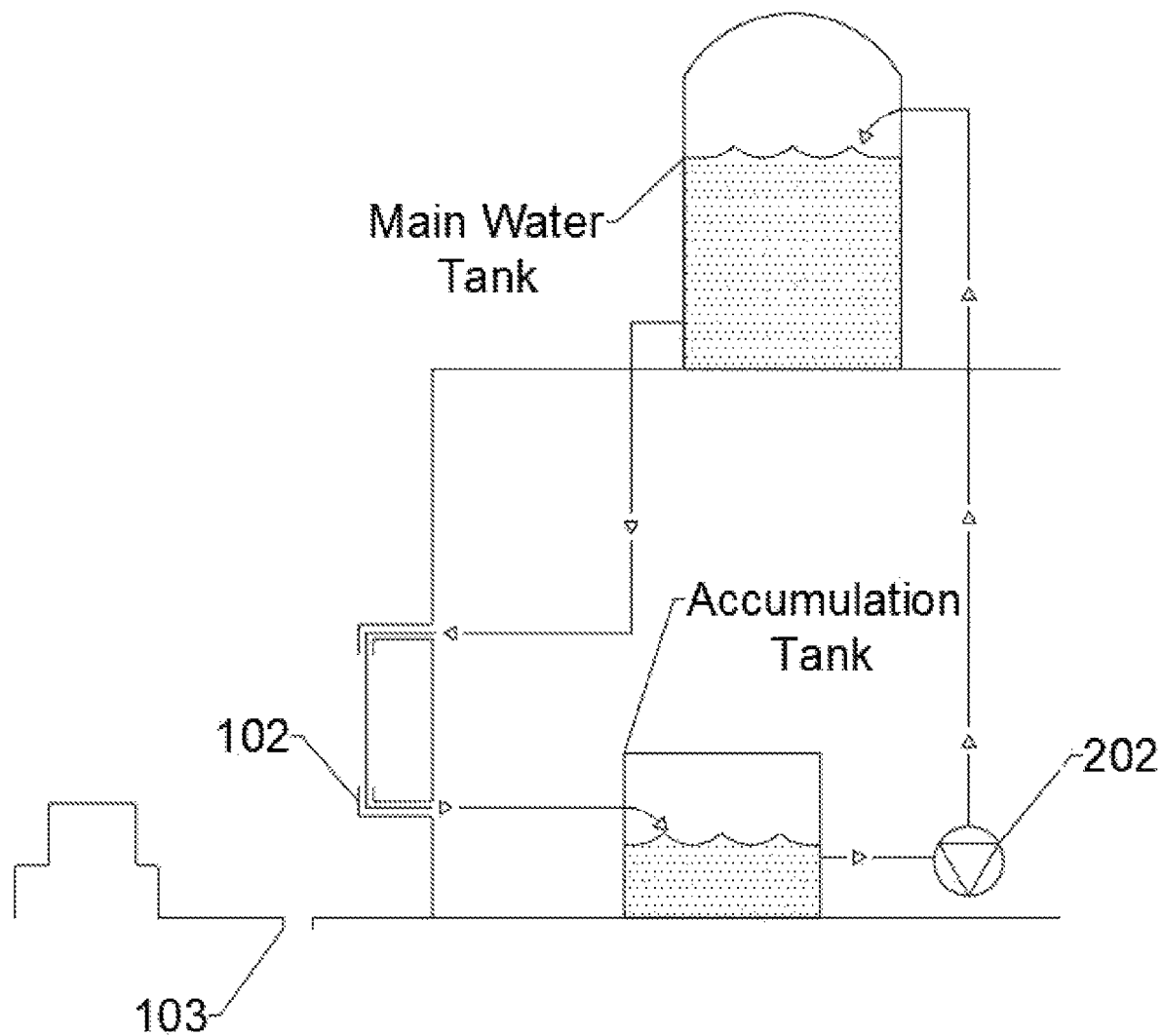
FIG. 21 shows the water circulation assembly with an accumulation tank and a main water supply tank.

FIG. 21 shows an example embodiment having a circulation loop for use in a mosque or an application deploying multiple circulating faucets 101. An accumulation tank is shown at the bottom of the system and is used to provide a continuous water feed to the pump 202. This prevents the pump 202 from pumping a two-phase mixture of water and air which can cause damage to the pump 202. The main water tank serves as storage for the water supply to the faucet(s) 101 and also provides adequate pressure for the faucets 101.

In one simple embodiment, a continuous water stream can be circulated in a contained passage as shown in FIGS. 22A-22D. The contained passage comprises two gates 702 and 703, which are pivoted with spring loaded hinges 701. Gates 702 and 703 are mounted between the faucet 101 and inlet 102. As the user places his/her hands, the two gates rotate letting the water rush through an opening in gate 702. The front view of the opening is shown in FIG. 22A. The side view depicts the position of the gates 702 and 703 when the water delivery system is not in use (FIG. 22B) or in use (FIG. 22C). When in use, the diverted water stream drains through the drain 103. As the user retracts his/her hand, the gates 702 and 703 close back to circulate the water. This circulation can be triggered using a regular valve 105 shown near the outlet 101 or the stream can be continuously circulated. Additionally, a flexible metallic string 704 can be wrapped around the hinges 701 and runs through the inside of the gates. As the gates 702 and 703 are activated, the flexible string 704 stretches and helps slide back the gates 702 and 703 into the closed position. This helps the gates 702 and 703 rotating without getting stuck.

Figure 23A:
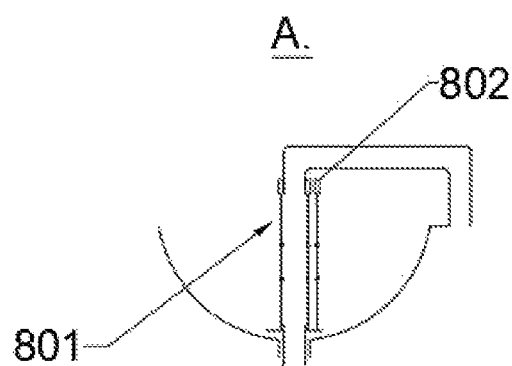
FIGS. 23A-23D show a modification to improve automatic faucets that can be attained by using laser light transducers.
Figure 23B:
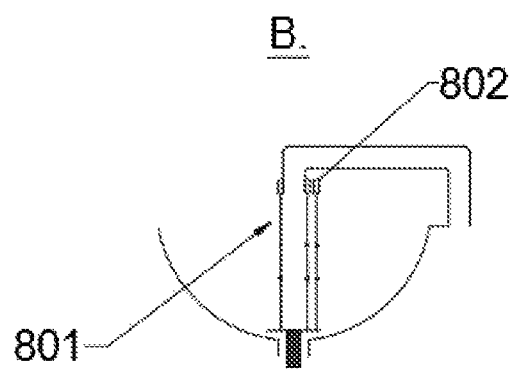
Figure 23C:
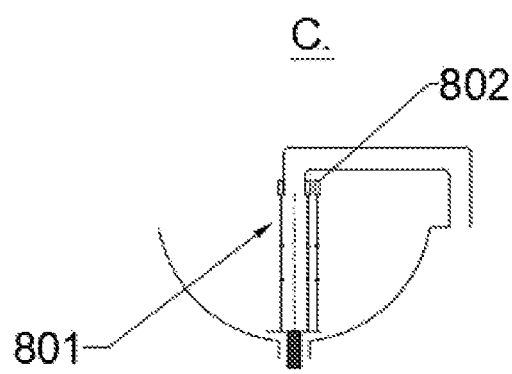
Figure 23D:
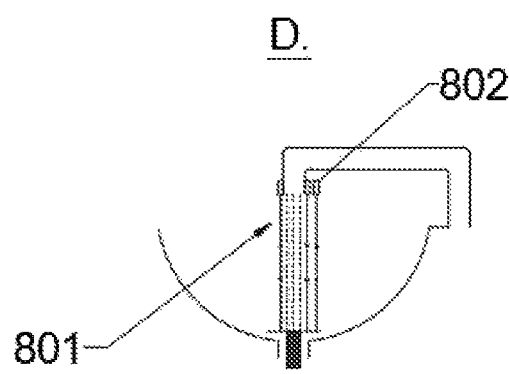

FIGS. 23A-23D illustrate another modification to improve automatic faucets that can be attained by using laser light transducers 802, and in specific geometric arrangements, to control sensing. The sensor arrangement 801 comprises visible light laser beams 802 and sensors instead of traditional infrared sensors for opening and closing faucets. When using infrared sensors, opening the faucet can be rather tricky since the user does not know where and when the sensor will detect her hands. With visible laser beams 802, the user would see the laser beam reflected off his/her hand as they pass under the faucet. When the laser beam is intersected by the user's hand, the faucet is switched on. A main disadvantage of automatic faucets is that they tend to have one fixed flow rate, which is either more than the user needs and hence wastes water, or too little for the water needs at certain times and hence inconvenient to the user. To overcome this disadvantage, the sensing arrangement 801 can use multiple laser transducers 802, with respective laser beams, in a way that allows the user to control the flow rate. Intersecting the first laser beam would open the faucet at the lowest possible flow rate achieving maximum water conservation. Intersecting the second or third laser beams would increase the flow rate to a medium or a maximum rate, respectively, as shown by FIGS. 23B-23D, between the different drawings with increasing number of beams. The laser beam switching arrangement 801 can be incorporated into embodiments of the present invention (as shown in FIG. 23A) or it can be incorporated into existing automatic faucets (as shown in FIG. 23B). FIGS. 23C-23D show how the water rate is controlled by the user to the desired level.

The embodiments shown in FIGS. 23A-23D is one embodiment of using laser beams 802 and sensors, other embodiments can involve a single laser beam transducer 802 and three or more sensors instead of the depicted three transducers 802. Geometric arrangements would be optimized to what is most effective to detect the user's hands. The sensor arrangement 801 can also be used for showers, either with the system of the present invention in which water is continuously circulated, or with standard automatic faucet type showers.

FIG. 24A is a water delivery system according to one embodiment showing different water stream paths (A-C). FIG. 24B is a chart depicting the water flow-rate, pressure, and circulation pump control required to ensure optimal operation and water conservation for the preferred embodiment. In the system of the present invention, one of the main controlling factors is the pump speed (for a given outlet size and outlet/inlet distance), which can be controlled very accurately particularly if the circulation pump 202 is being driven by a digital motor. The rotation rate of the pump 202 will control the flow rate of the water in the system. Hence, the rotation rate of the pump 202 will determine the water pressure at the outlet 101 given that the area of the outlet 102 and the pressure loses in the plumbing is fixed. Therefore, the output pressure must be adjusted so that the water stream can bridge the gap between the outlet 101 and inlet 102. A low output pressure will cause the stream to miss the inlet 102 and enter the drain 103. Once the pressure is raised to reach the threshold value required to bridge the gap between the faucet 101 and the inlet 102, the water beam will be the lower, highly curved one, as shown in FIG. 24A. The water beam with the minimum pressure and flow rate needed to bridge the gap is water stream 'A'. As the pressure is increased, the water beam will be less curved and almost straight as depicted in the upper water beam 'C'. Notice the side view of the water inlet 102, which is elliptical to account for the variable water beam curvature. Water beam 'B' has a flow rate that enables the beam to bridge the gap and reach a point slightly higher than the minimum height. This flow rate ensures that the beam bridges the gap and leaves a small contingency for uncontrolled variables while not having a flow rate that is too high. At the maximum pump rotation speed and hence the maximum water output pressure and flow rate, the system would essentially be circulating water faster than needed much like opening a traditional faucet to its maximum. FIG. 24B is a graph of the water flow rate versus the output pressure at the outlet 102 and the points labelled. Note, during installation the pump 202 can be calibrated to ensure the water beam has the proper trajectory.

It should also be noted that the invention can eliminate the need for a separate traditional mechanical faucet, in desired, to regulate the water flow or to control the flow rate.

Opening, shutting and varying the flow of water will all be done by the pump. Meanwhile, the pump can be controlled electronically using touchless sensors, or other more basic means, but it can also be calibrated initially and set to constant flow rate where the water would bridge the gap from the faucet 101 to the outlet 102.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A water delivery system comprising:
    an outlet in communication with a water source,
        wherein water from the water source exits through the outlet;
    an inlet for receiving water exiting the outlet,
        wherein the inlet is separated from the outlet by a gap;
        wherein the water traverses the gap during uninterrupted flow,
        wherein water received by the inlet is recirculated to the outlet; and
    wherein water exiting the outlet but not received by the inlet is diverted to a drain.

2. The water delivery system of claim 1, further comprising:
    a circulation system for providing water from at least one of the water source and the inlet to the outlet.

3. The water delivery system of claim 1, further comprising:
    a basin, wherein the outlet and the inlet are positioned on opposite sides of the basin.

4. The water delivery system of claim 2, wherein the circulation system comprises a water circulation pump and a circulation valve.

5. The water delivery system of claim 1, wherein the inlet further comprises an enlarged receptor.

6. The water delivery system of claim 2, wherein the circulation system routes the water through a heater.

7. The water delivery system of claim 1, further comprising:
    a first hinged gate attached to the outlet; and
    a second hinged gate attached to the inlet,
        wherein the first hinged gate and the second hinged gate are collinear with a line extending from the outlet to the inlet.

8. The water delivery system of claim 1, wherein the water entering the drain has been interrupted from reaching the inlet.

9. The water delivery system of claim 1, wherein the inlet is positioned at a height above the outlet.

10. The water delivery system of claim 1, wherein the inlet is positioned at a height above the drain.

* * * * *